US006741110B2

(12) United States Patent
Roisen

(10) Patent No.: US 6,741,110 B2
(45) Date of Patent: May 25, 2004

(54) METHOD AND/OR CIRCUIT FOR GENERATING PRECISION PROGRAMMABLE MULTIPLE PHASE ANGLE CLOCKS

(75) Inventor: Roger L. Roisen, Minnetrista, MN (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/156,360

(22) Filed: May 28, 2002

(65) Prior Publication Data

US 2003/0222694 A1 Dec. 4, 2003

(51) Int. Cl.$^7$ .................................................. H03L 7/06
(52) U.S. Cl. ........................ 327/158; 327/149; 375/376; 331/DIG. 2
(58) Field of Search ................................ 327/146–150, 327/152, 153, 155–160; 375/373–376; 331/1 A, DIG. 2

(56) References Cited

U.S. PATENT DOCUMENTS

| 5,943,382 | A | * | 8/1999 | Li et al. ...................... 375/376 |
| 6,025,743 | A | * | 2/2000 | Abe ............................ 327/159 |
| 6,043,717 | A | * | 3/2000 | Kurd ............................ 331/17 |
| 6,380,776 | B1 |   | 4/2002 | Yocom ........................ 327/163 |
| 6,411,142 | B1 | * | 6/2002 | Abbasi et al. ............... 327/156 |
| 6,597,218 | B1 | * | 7/2003 | Gauthier et al. ............ 327/158 |

\* cited by examiner

Primary Examiner—Minh Nguyen
(74) Attorney, Agent, or Firm—Christopher P. Maiorana, PC

(57) ABSTRACT

An apparatus having a first circuit, a second circuit, and a third circuit. The first circuit may be configured to generate a first phase control signal in response to a phase difference between a first input clock signal and a first output clock signal. The second circuit may be configured to generate a second phase control signal in response to a phase adjust signal. The third circuit may be configured to generate the first output clock signal by delaying the first input clock signal in response to a delay control signal. The delay control signal may be generated by summing the first and the second phase control signals.

20 Claims, 5 Drawing Sheets

METHOD AND/OR CIRCUIT FOR GENERATING PRECISION PROGRAMMABLE MULTIPLE PHASE ANGLE CLOCKS

FIELD OF THE INVENTION

The present invention relates to a method and/or architecture for generating clocks generally and, more particularly, to a method and/or architecture for generating multiphase high speed clocks.

BACKGROUND OF THE INVENTION

High bit error rates at high clock rates can limit clock speeds. Conventional clock circuits are implemented having intermediate stages of delay lines or ring oscillators to generate additional clock phases. For example, conventional delay locked loop clock circuits configured to generate four phases include eight serially connected inverter stages and tap every other stage to obtain the four output clock phases. However, conventional clock circuits have one or more of the following deficiencies (i) at high clock rates, the delay through each stage is too great relative to the clock rate and/or (ii) for higher degrees of phase resolution greater numbers of stages are implemented (i.e., to generate 32 phases of a clock, 64 stages are implemented) which can cause even greater delays, excessive chip area, and/or excessive cost.

It would be desirable to have an architecture and/or method for generating multiphase clock signals that may (i) reduce or eliminate latch setup and/or hold errors, (ii) implement programmable phase adjustment, (iii) provide phase adjustment in response to one or more error rates, (iv) be implemented in double data rate applications, and/or (v) be implemented in high clock signal rate applications.

SUMMARY OF THE INVENTION

The present invention concerns an apparatus comprising a first circuit, a second circuit, and a third circuit. The first circuit may be configured to generate a first phase control signal in response to a phase difference between an input clock signal and an output clock signal. The second circuit may be configured to generate a second phase control signal in response to a phase adjust signal. The third circuit may be configured to generate the output clock signal in response to a phase adjustment of the input clock signal. The phase adjustment may be generated in response to a sum of the first and second phase control signals.

The objects, features and advantages of the present invention include providing a high speed architecture and/or method for generating multiphase clock signals that may (i) implement very accurate clock signal phase offset adjustment, (ii) implement predetermined increments of phase adjustment, (iii) be implemented in double data rate applications, (iv) implement user programmable phase adjustment, (v), implement phase adjustment in response to one or more error rates, (vi) reduce or eliminate latch setup and hold errors, (vii) generate two rising edge and/or two falling edge clock signals, and/or (viii) be implemented in high clock signal rate applications.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
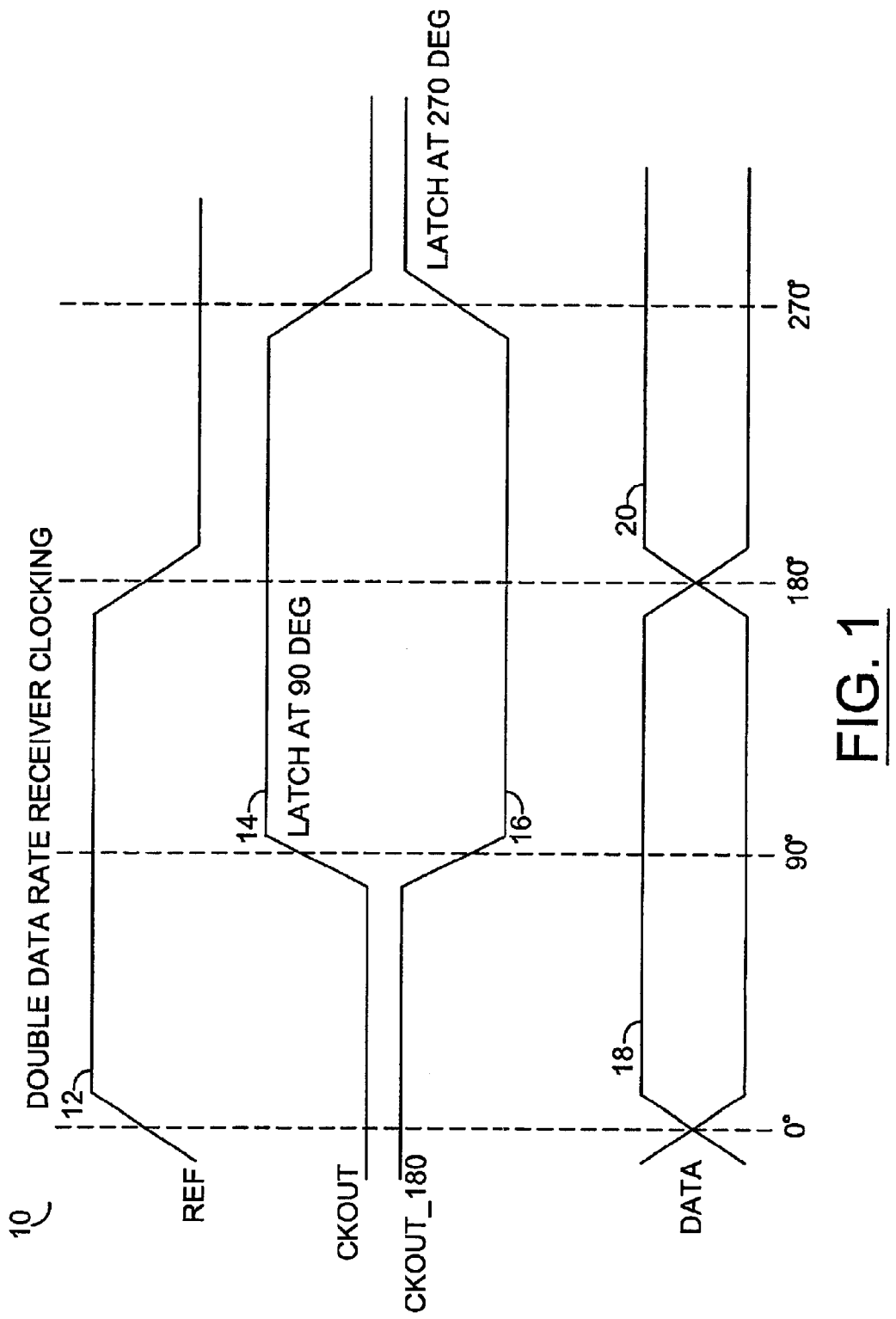
FIG. 1 is a diagram of waveforms of the present invention.

Referring to FIG. 1, a diagram 10 of clock signal waveforms is shown in accordance with a preferred embodiment of the present invention. The diagram 10 may illustrate a double data rate application (e.g., an application where two bits of data are generally presented per reference clock cycle). A waveform 12 may illustrate a reference clock signal (e.g., REF). In one example, the signal REF may be implemented as a 500 MHz or higher signal. The present invention may be advantageously implemented when the signal REF is a relatively high speed (e.g., greater than 1 GHz) clock signal. However, the signal REF may be implemented at any appropriate rate (speed) to meet the design criteria of a particular application.

A waveform 14 and a waveform 16 may illustrate clocking signals generated in accordance with the present invention. The waveform 14 may illustrate a clock signal (e.g., CKOUT) and the waveform 16 may illustrate a clock signal (e.g., CKOUT_180) that is generally 180° out of phase with the signal CKOUT (e.g., when the signal CKOUT is delayed by 90° relative to the signal REF, the signal CKOUT_180 is generally delayed by 270° relative to the signal REF). A waveform 18 and a waveform 20 may illustrate bits of a data signal (e.g., bits of a signal DATA).

The signal DATA is generally a multi-bit (e.g., DATAa–DATAn, where n is an integer) signal. The signal DATA is generally presented in phase with the signal REF and at a speed that is double the rate of the signal REF (e.g., two bits of the signal DATA are generally presented during a single cycle of the signal REF). During a HIGH (e.g, logical 1 or on) portion (e.g., rising edge) of the clock signal CKOUT a first bit of the signal DATA (e.g., the waveform 18) may be latched and during a LOW (e.g., logical 0 or off) portion of the clock signal CKOUT (e.g., a rising edge of the signal CKOUT_180) a second bit of the signal DATA (e.g., the waveform 20) may be latched.

The ideal time to latch the signal DATA is generally in the center of the data eye (e.g., when the signal CKOUT is delayed by substantially 90° relative to the signal REF for the first bit of the signal DATA and when the signal CKOUT is delayed by substantially 270° relative to the signal REF for the second bit of the signal DATA). Conventional approaches for double data rate clocking circuits implement delay lock loop circuits that generate a clock signal that triggers latching that is phase offset at 90° relative to the reference clock signal REF. The conventional double data rate clocking circuits trigger the latching of the first data bit on the rising edge of the clock signal and trigger the latching of the second data bit on the falling edge of the clock signal. However, conventional approaches can (i) be inaccurate in high speed (e.g., high data rate) applications and/or (ii) introduce timing errors due to the difference in setup and hold times between the latches that are implemented to latch the first and second data bits (e.g., rising edge versus falling edge latches).

The present invention generally provides clocking signals (e.g., the signals CKOUT and CKOUT_180) having two rising edges (e.g., the signal CKOUT at substantially 90° and the signal CKOUT_180 at substantially 270° relative to the reference clock signal REF). The two rising edges of the clocking signals CKOUT and CKOUT_180 provided by the present invention generally (i) provide reduced and/or minimum error at high clocking rates and (ii) reduce and/or eliminate errors due to latch setup and hold time differences when compared to conventional approaches.

The present invention is generally configured to provide output clock signal phase adjustment relative to the input clock signal. The output clock signal phase adjustment may be programmable. In one example, the phase of the output clock signal (and/or signals) may be dynamically ("on the fly") adjusted in response to a bit error rate as determined by error detection circuitry. In another example, the phase of the output clock signal (and/or signals) may be adjusted (e.g., programmed, set, fixed) to a phase offset (difference) relative to the input clock signal that is predetermined by a user. The output clock signal phase adjustment implemented by the present invention may be configured to be at predetermined increments (or gradients).

Figure 2:
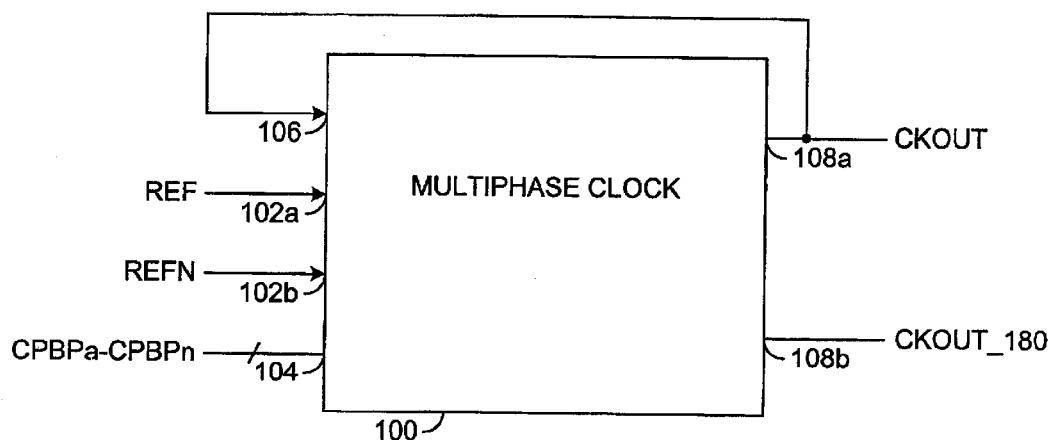
FIG. 2 is a block diagram of the present invention.

Referring to FIG. 2, a circuit 100 illustrating the present invention is shown. The circuit 100 may be implemented as a multiphase clock circuit. The circuit 100 may be implemented as a delay locked loop circuit. The circuit 100 may be implemented in a high speed, double data rate application. The circuit 100 may have a pair of inputs 102a and 102b that may receive a pair of signals (e.g., the signal REF and a signal REFN, respectively), an input 104 that may receive a signal (e.g., CPBP), an input 106 that may receive a signal (e.g., the signal CKOUT), and a pair of outputs 108a and 108b that may present a pair of signals (e.g., the signals CKOUT and CKOUT_180, respectively).

The signal REFN may be implemented as the complement of the signal REF. The signals REF and REFN are generally implemented as 50% duty cycle input reference clock signals. However, the signals REF and/or REFN may be implemented with any appropriate duty cycle to meet the design criteria of a particular application.

The signal CPBP may be implemented as a phase adjustment signal. The signal CPBP is generally implemented as a multi-bit signal (e.g., CPBPa–CPBPn, where n is an integer). In one example, the signal CPBP may be dynamically generated by error detection circuitry (not shown) in response to one or more error rates (e.g., the error rate of one or more signals (not shown) monitored by the error detection circuitry). The signals monitored by the error detection circuitry generally correspond to (are related to) the signals CKOUT and/or CKOUT_180. In another example, the signal CPBP may be generated in response to user programming (e.g., the signal CPBP may be programmable). The user may program the signal CPBP such that the signal CKOUT (and/or CKOUT_180) is generated at a predetermined (e.g., set, fixed) phase offset relative to the signal REF (and/or REFN).

The signal CKOUT may be implemented as an output clock signal. The signal CKOUT_180 is generally implemented at a phase offset of 180° relative to the signal CKOUT. The clock signals CKOUT and CKOUT_180 are generally configured to trigger the latching of one or more data bits (e.g., one or more bits of the signal DATA). The signal CKOUT is generally fed back to the circuit 100 through the input 106. The circuit 100 is generally configured to generate the signals CKOUT and/or CKOUT_180 in response to the signals REF and/or REFN, CPBP, and CKOUT. The circuit 100 may be configured to adjust the phase (delay) of the signals CKOUT and/or CKOUT_180 relative to the signal REF (and/or REFN) in response to the signal CPBP. The circuit 100 may be configured to adjust the phase of the signals CKOUT and/or CKOUT_180 at predetermined increments (gradients).

Figure 3:
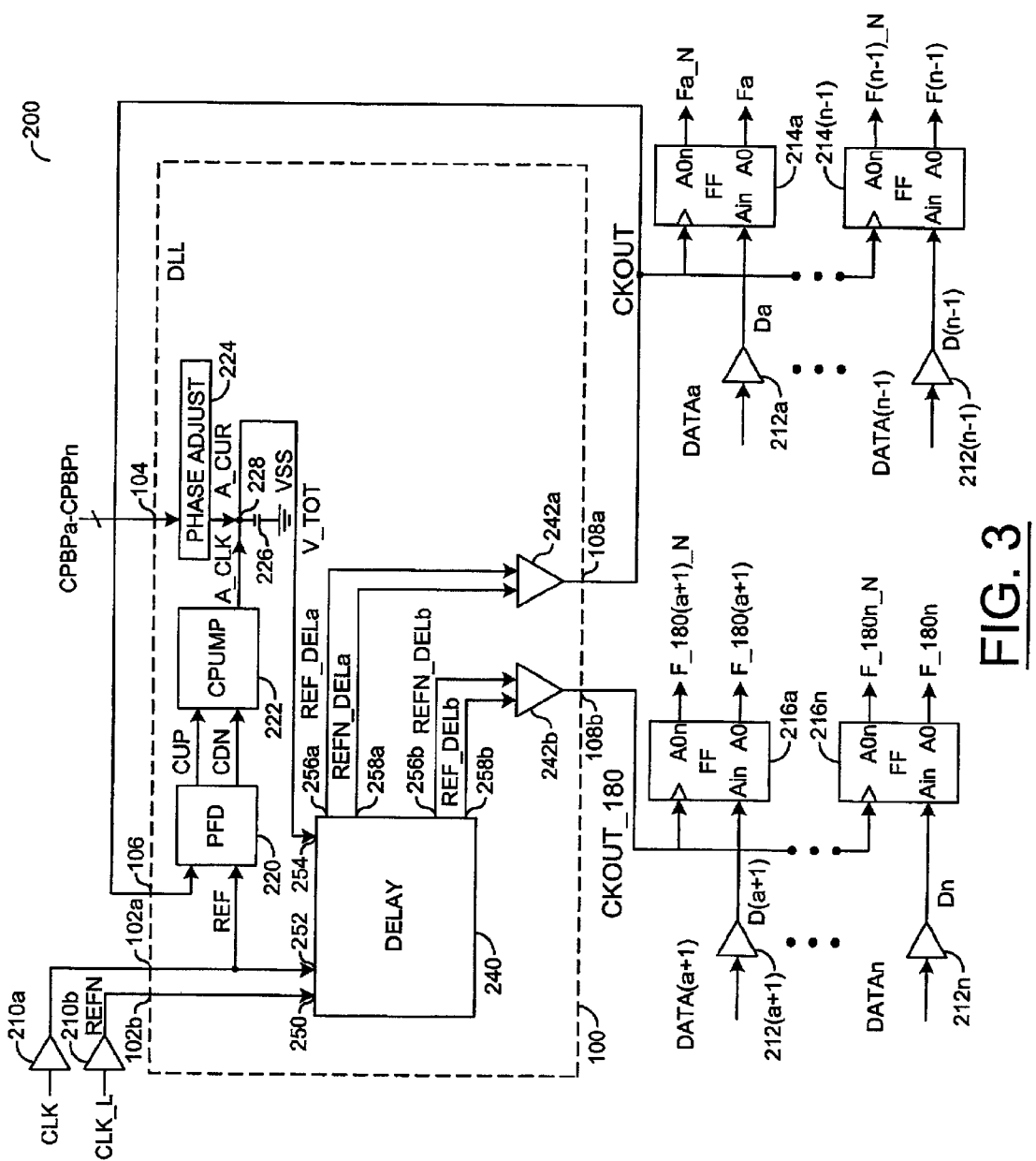
FIG. 3 is a detailed block diagram of the present invention.

Referring to FIG. 3, a circuit 200 illustrating a preferred embodiment of the present invention is shown. The circuit 200 generally comprises the circuit 100, a pair of devices 210 (e.g., 210a and 210b), one or more devices 212 (e.g., 212a–212n), one or more devices 214 (e.g., 214a–214n), and one or more devices 216 (e.g., 216a–216n). The devices 210 and 212 may be implemented as buffer (amplifier) circuits. The devices 214 and 216 may be implemented as latch circuits. The device 216 may be implemented similar to the device 214. In one example, the devices 214 and 216 may be implemented as D-type flip-flop circuits. However, the devices 214 and 216 may be implemented as any appropriate latch circuits and/or devices to meet the design criteria of a particular application. The circuit 200 may be implemented in the context of a double data rate receiver in accordance with the present invention.

The device 210a may have an input that may receive a signal (e.g., CLK) and an output that may present the signal REF. The device 210b may have an input that may receive a signal (e.g., CLK_L) and an output that may present the signal REFN. The signal CLK may be implemented as a system clock signal. The signal CLK_L may be implemented as the complement of the signal CLK. The signals CLK and CLK_L are generally implemented as 50% duty cycle input clock signals. The devices 210a and 210b may be configured to generate the signals REF and REFN in response to the signals CLK and CLK_L, respectively. The devices 210a and 210b generally buffer the input clock signals CLK and CLK_L. The devices 210a and 210b are generally well matched (e.g., provide substantially equal delay and/or phase shift) to the signals CLK and CLK_L. The devices 212a–212n may have an input that may receive a respective bit of the signal DATA (e.g., DATAa–DATAn) and an output that may present a signal that corresponds to a buffered version of the signal DATA (e.g., Da–Dn).

The devices 214a–214n may have a clock input that may receive the signal CKOUT, a data input that may receive a respective data signal (alternating ones of the data signals Da–D(n−1), e.g., Da, D(a+2) . . . ), an output that may present a signal that corresponds to a latched version of the signal D (e.g., Fa–F(n−1)), and an output that may present a complement (e.g., inverse) of the latched data signal F (e.g., Fa_N–F(n−1)_N). The device 214 may be configured to latch the signal D and present the signal F in response to the signal CKOUT.

The devices 216a–216n may have a clock input that may receive the signal CKOUT_180, a data input that may receive a respective data signal (the other alternating ones of the data signals D(a+1)–Dn, e.g., D(a+1), D(a+3) . . . ), an output that may present a signal that corresponds to a latched version of the signal D (e.g., F_180(a+1)–F_180n), and an output that may present a complement (e.g., inverse) of the latched data signal F_180 (e.g., F_180(a+1)_N–F_180n_N). The device 216 may be configured to latch the signal D and present the signal F_180 in response to the signal CKOUT_180.

The circuit 100 generally comprises a circuit (or block) 220, a circuit (or block) 222, a circuit (or block) 224, a device 226, a node 228, a circuit (or block) 240, and a pair of devices (or circuits) 242 (e.g., 242a and 242b). In one example, the circuit 220 may be implemented as a phase/frequency detector (PFD) circuit. In another example, the circuit 220 may be implemented as a phase detector (PD) circuit. The circuit 222 may be implemented as a charge pump circuit. The circuit 224 may be implemented as a phase adjustment control circuit. The device 226 may be implemented as a capacitance. In one example, the device 226 may be implemented as one or more capacitors. In another example, the device 226 may be implemented as one or more transistors configured as capacitors. The circuit 240 may be implemented as a delay circuit. Each of the devices 242 may be implemented as a differential amplifier circuit.

The circuit 220 may have an input that may receive the signal REF, an input that may receive the signal CKOUT, an output that may present a signal (e.g., CUP), and an output that may present a signal (CDN). The signals CUP and CDN may be implemented as pump control signals. The signal CUP may be a pump up signal and the signal CDN may be a pump down signal.

The circuit 220 may be configured to generate the signals CUP and CDN in response to a phase difference between the signals REF and CKOUT. When the phases of the signals REF and CKOUT do not match (e.g., the signals REF and CKOUT are out of phase), the circuit 220 may be configured to generate the signal CUP or the signal CDN. When the signals REF and CKOUT are in phase, the signals CUP and CDN are generally of equal pulse width, thus having the effect of a zero signal when the charge pump 222 internal up current and down current are added. The circuit 220 may be configured to generate the circuit CUP when the clock signal CKOUT leads the clock signal REF (e.g., delay may be provided and/or increased to the signal CKOUT such that the signals CKOUT and REF are in phase). Similarly, the circuit 220 may be configured to generate the signal CDN when the clock signal CKOUT lags the clock signal REF (e.g., delay may be reduced and/or eliminated from the signal CKOUT such that the signals CKOUT and REF are in phase). However, the generation of the signals CUP and CDN in response to the lead/lag phase relationship of the signals REF and CKOUT may be opposite (reversed) to meet the design criteria of a particular application.

The circuit 222 may have an input that may receive the signal CUP, an input that may receive the signal CDN, and an output that may present a signal (e.g., A_CLK). The signal A_CLK may be implemented as a phase control signal. The signal A_CLK may be implemented as a current signal. The circuit 222 may be configured to generate the signal A_CLK in response to the signals CUP and CDN (and/or the respective complement signals, e.g., CUP_N and CDN_N). The effective value (amount, level) of the signal A_CLK in generally proportional to the difference in phase between the signals REF and CKOUT. As such, the circuits 220 and 222 may provide a means for generating the phase control signal a A_CLK. In one example, the signal A_CLK may be generated as a positive current in response to the signal CUP and a negative current in response to the signal CDN. However, the signal A_CLK may be generated having opposite (reversed) polarity to meet the design criteria of a particular application. The phase control signal A_CLK is generally presented to the node 228. The circuit 220 coupled to the circuit 222 may be configured to generate the signal A_CLK in response to a phase difference between the signals REF and CKOUT.

The circuit 224 may have an input that may receive the signal CPBP and an output that may present a signal (e.g., A_CUR). The signal A_CUR may be implemented as a phase control signal. The signal A_CUR may be implemented as a current signal. The signal A_CUR may be implemented as a steering current. The signal A_CUR may be configured to steer the PFD circuit 220 to settle at a very precise phase offset (delay). The circuit 224 may be configured to generate the signal A_CUR in response to the signal CPBP. As such, the circuit 224 may provide a means for generating the phase control signal A_CUR. The phase control signal A_CUR is generally presented to the node 228.

The capacitance 226 may have a first terminal that may be connected to the node 228 and a second terminal that may be connected to a ground potential (e.g., VSS). The device 226 may be configured to accumulate charge and generate a voltage signal (e.g., V_TOT) in response to the current presented to the node 228. The voltage signal V_TOT generally has a value (amount, level) that is proportional to the sum of the phase adjustment control (current) signals A_CLK and A_CUR. The signal V_TOT may be implemented as a delay (phase adjustment) control signal. As such the device 226 may provide a means for generating the delay control signal V_TOT. The circuit 100 may be configured to adjust (control) the phase (delay) of the signal CKOUT (and/or the signal CKOUT_180) relative to the signal REF in response to the signal V_TOT (e.g., in response to a sum of the signals A_CLK and A_CUR).

The circuit 240 may have an input 250 that may receive the signal REFN, an input 252 that may receive the signal REF, an input 254 that may receive the signal V_TOT, an output 256a that may present a signal (e.g., REF_DELa), an output 258a that may present a signal (e.g., REFN_DELa), an output 256b that may present a signal (e.g., REFN_DELb), and an output 258b that may present a signal (e.g., REF_DELb). The signals (i) REF_DELa and REF_DELb and (ii) REFN_DELa and REFN_DELb may be implemented as delayed (e.g., phase adjusted) versions of the signals REF and REFN, respectively. The circuit 240 may be configured to generate the signals REF_DELa, REF_DELb, REFN_DELa and REFN_DELb in response to the signals REF, REFN, and V_TOT (e.g., the circuit 240 may be configured to delay and/or phase adjust the signals REF and REFN in response to the signal V_TOT). As such, the circuit 240 may provide a means for generating an output clock signal in the form of the signals REF_DELa and REFN_DELa. The circuit 240 may be configured to provide substantially equal phase adjustment (e.g., delay) to the signals REF_DELa, REF_DELb, REFN_DELa and REFN_DELb.

The device (or circuit) 242a may have a first input that may receive the signal REF_DELa, a second input that may receive the signal REFN_DELa, and an output that may present the signal CKOUT. The circuit 242a may be configured to generate the signal CKOUT in response to the signals REF_DELa and REFN_DELa (e.g., the signal REF). The device (or circuit) 242b may be implemented similarly to the device (or circuit) 242a. The circuit 242b may have a first input that may receive the signal REF_DELb, a second input that may receive the signal REFN_DELb, and an output that may present the signal CKOUT_180. The circuit 242b may be configured to generate the signal CKOUT_180 in response to the signals REF_DELb and REFN_DELb (e.g., the signal REFN). The devices 242a and 242b are generally well matched (e.g., provide substantially equal delay and/or phase shift) to the signals CKOUT and CKOUT_180. The circuit 100 may generate the phase adjustment (delay) to the input clock signals REF and/or REFN to generate the respective output clock signals CKOUT and/or CKOUT_180 in response to the signal V_TOT (e.g., a sum of the signals A_CLK and A_CUR).

Figure 4:
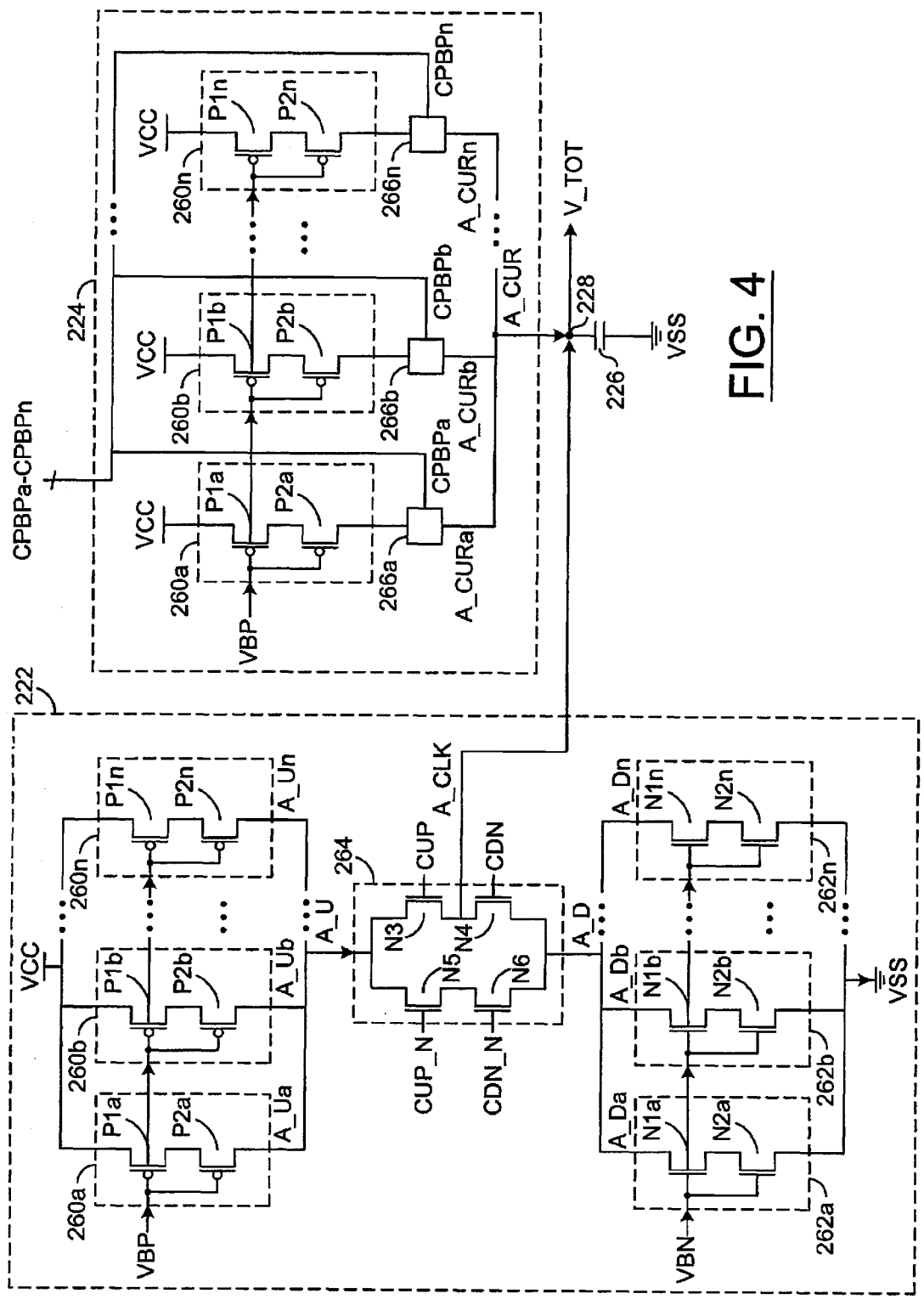
FIG. 4 is a block diagram illustrating a charge pump circuit and a phase adjustment circuit of the present invention.

Referring to FIG. 4, a more detailed diagram illustrating the circuits 222 and 224 in accordance with a preferred embodiment of the present invention is shown. The circuit 222 generally comprises one or more circuits 260 (e.g., 260a–260n), one or more circuits 262 (e.g., 262a–262n), and a circuit 264. The circuit 260 may be implemented as a current source circuit. The current sources 260a–260n are generally matched (e.g., substantially equal). Each of the circuits 260a–260n may have an input that may receive a supply voltage (e.g., VCC), an input that may receive a bias signal (e.g., VBP) and an output that may present a respective portion of a current signal A_U (e.g., A_Ua–A_Un). The signal A_U generally comprises a sum of the signals A_Ua–A_Un. The signal A_U is generally a pump up current. The circuits 262a–262n may be implemented as matched current sources. Each of the circuits 262a–262n may have an input that may receive the ground potential VSS, an input that may receive a bias signal (e.g., VBN), and an output that may present a respective portion of a current signal A_D (e.g., A_Da–A_Du). The signal A_D generally comprises a sum of the signals A_Da–A_Dn. The signal A_D is generally a pump down current.

The circuit 264 may have inputs that may receive the signals CUP and CDN (and/or the respective complements CUP_N and CDN_N), an input that may receive the signal A_U, an input that may receive the signal A_D, and an output that may present the signal A_CLK. The circuit 264 may be configured to present the signal A_U or the signal A_D as the signal A_CLK in response to the signals CUP and CDN (and/or CUP_N and CDN_N), respectively.

The circuit 260 generally comprises a first transistor P1 and a second transistor P2 configured as a cascoded pair. The transistor P1 may have a first source/drain that may receive the supply voltage VCC, a gate that may receive the bias signal VBP, and a second source/drain than may be connected to a first source/drain of the transistor P2. The transistor P2 may have a gate that may receive the bias signal VBP and a second source/drain that may present the respective signal A_U. In a preferred embodiment the matched current sources 260 may be implemented as one or more FETs (e.g., the PMOS transistors P1 and P2). However, the matched current sources 260 may be implemented as any appropriate devices and/or circuits to meet the design criteria of a particular application.

In one example, each of the transistor pairs P1 and P2 of the circuits 260a–260n may be configured to have an effective width and length parameter substantially equal to W/L (e.g., the circuits 260a–260n may be configured as substantially equal current sources). The value of the current signal A_U may correspond to (be proportional to) the number of circuits 260 that are implemented in the circuit 222. For example, when the circuit 222 is configured to generate the signal A_U via 360 of the circuits 260 (e.g., n=360) and the parameter W/L corresponds to a current of 1 $\mu$A (e.g., each of the signals A_Ua–A_Un equals 1 $\mu$A), the total current A_U (or A_CLK) may equal 360 $\mu$A. However, the value of the parameter W/L, the number of circuits 260, and/or the current A_U may be implemented as any appropriate value to meet the design criteria of a particular application.

The circuit 262 generally comprises a first transistor N1 and a second transistor N2 configured as a cascoded pair. The transistor N1 may have a first source/drain that may present the respective signal A_Da–A_Dn, a gate that may receive the bias signal VBN, and a second source/drain that may be connected to a first source/drain of the transistor N2. The transistor N2 may have a gate that may receive the bias signal VBN and a second source/drain that may receive the ground potential VSS. In a preferred embodiment the matched current sources 262 may be implemented as one or more FETs (e.g., the NMOS transistor N1 and N2). However, the matched current sources 262 may be implemented as any appropriate devices and/or circuits to meet the design criteria of a particular application.

In one example, each of the transistor pairs N1 and N2 of the circuits 262a–262n may be configured to have an effective width and length parameter substantially equal to W/L (e.g., the circuits 262a–262n may be configured as substantially equal current sources).

The value of the current signal A_D may correspond to (be proportional to) the number of circuits 262 that are implemented in the circuit 222. For example, when the circuit 222 is configured to generate the signal A_D via 360 of the circuits 262 (e.g., n=360) and the parameter W/L corresponds to a current of 1 $\mu$A (e.g., each of the signals A_Da–A_Dn equals 1 $\mu$A), the total current A_D (or A_CLK) may equal 360 $\mu$A. However, the value of the parameter W/L, the number of circuits 262 and/or the current A_D may be implemented as any appropriate value to meet the design criteria of a particular application.

The circuit 264 generally comprises NMOS transistors N3, N4, N5, and N6 configured as a switching circuit. The transistors N3, N4, N5, and N6 may be configured to present (i) the signal A_U or (ii) the signal A_D as the signal A_CLK in response to the signals CUP or CDN (and/or CUP_N or CDN_N), respectively.

The circuit 224 generally comprises one or more of the circuits 260 (e.g., circuits 260a–260n) and one or more respective circuits 266 (e.g., circuits 266a–266n). The circuit 266 is generally implemented as a control (e.g., switch) circuit. Each of the circuits 266 may be coupled in series between the respective circuit 260 and the node 228. Each of the circuits 266 may have an input that may receive a respective bit of the control signal CPBP (e.g., control signals CPBPa–CPBPn).

Each of the circuits 260 of the circuit 224 may generate a respective portion of the current signal A_CUR (e.g., a current signal A_CURa–A_CURn). The signals CPBPa–CPBPn may be configured to switch on or off (control) any appropriate number of the signals A_CURa–A_CURn via the circuits 266a–266n. The signal A_CUR generally equals the sum of the signals A_CURa–A_CURn that are switched on.

The circuit 100 may implement current density matching. The current density of the circuits 260 in the circuit 224 may match the current density of current sources 260 and/or 262 of the circuit 222. The circuit 224 may be configured having any predetermined desired number of the circuits 260 to generate fine (e.g., narrow, accurate, precise) incremental phase (delay) adjustments via the signal CPBP (and the signal A_CUR). For example, when the circuit 222 is implemented having 360 current sources 260 and/or 262 each having an output current of 1 $\mu$A and the circuit 224 is implemented having 360 of the current sources 260 each having an output signal A_CUR$_1$–A_CUR$_{360}$ of 1 $\mu$A, each of the current signals A_CURa–A_CURn (e.g., each bit of the signal CPBP) may correspond very precisely to 1° of phase shift. The circuit 100 may be implemented having any appropriate predetermined increment (gradient) of phase adjustment precision and accuracy through the implementation of the number and the effective current density matching of the circuit 224 relative to the circuit 222.

Figure 5:
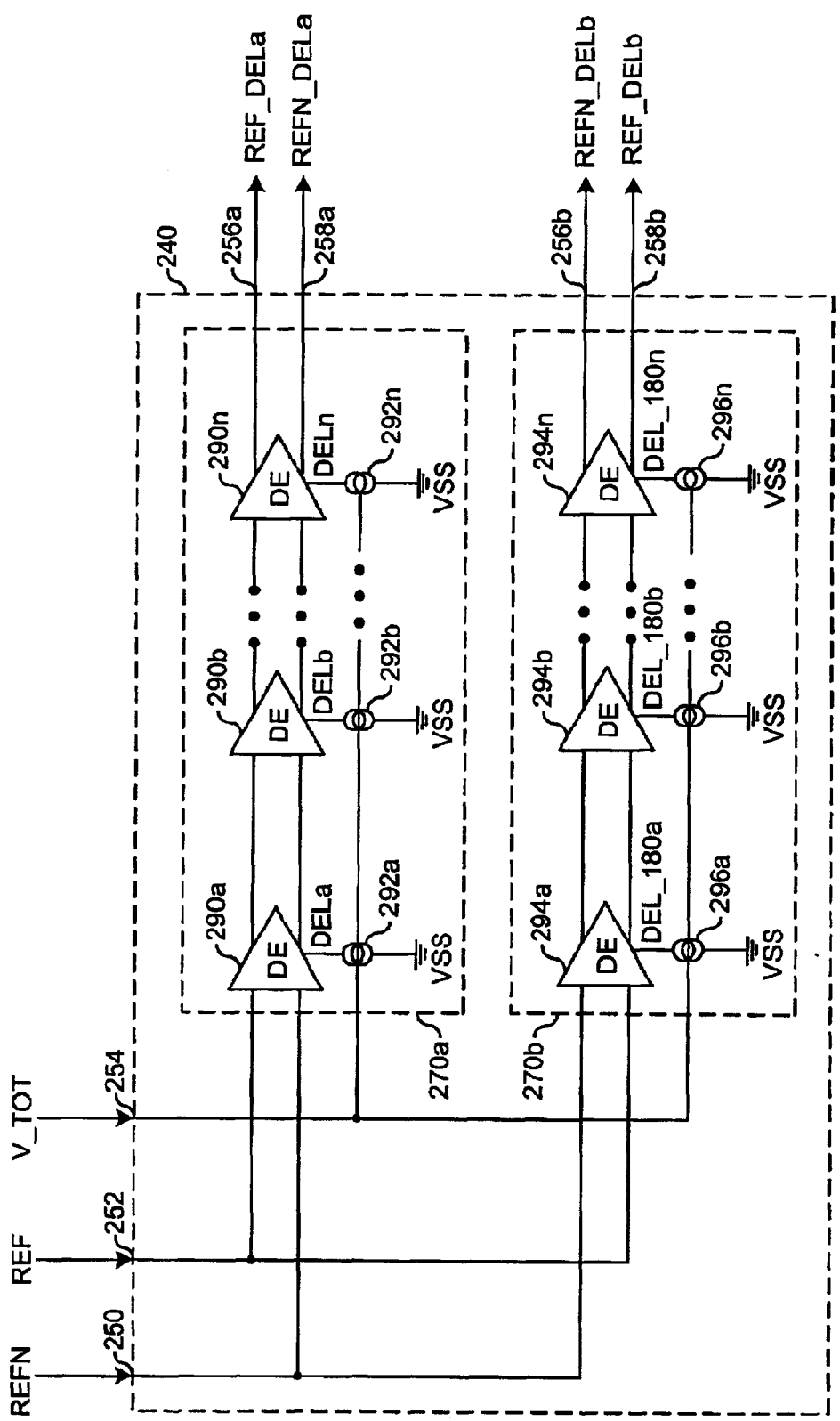
FIG. 5 is a block diagram illustrating a delay circuit of the present invention.

Referring to FIG. 5, a block diagram illustrating the delay circuit 240 in accordance with the present invention is shown. The circuit 240 generally comprises a pair of circuits (or blocks) 270a and 270b. The circuits 270a and 270b may be implemented as delay lines. The circuit 270a may have an input that may receive the signal REF, an input that may receive the signal REFN, an input that may receive the signal V_TOT, an output that may present the signal REF_DELa, and an output that may present the signal REFN_DELa. The circuit 270a may be configured to generate the signals REF_DELa and REFN_DELa in response to the signals REF, REFN, and V_TOT (e.g., the circuit 270a may be configured to provide phase adjustment (delay) to the signals REF and REFN in response to the signal V_TOT).

The circuit 270a generally comprises one or more devices (or circuits) 290 (e.g., 290a–290n) and one or more devices (or circuits) 292 (e.g., 292a–292n). The circuits 290a–290n may be implemented as differential buffer circuits configured as current controlled delay elements. The circuits 292a–292n may be implemented as voltage controlled current sources. The circuits 290a–290n are generally connected in series. Respective ones of the circuits 292a–292n may be coupled to the circuits 290a–290n. A circuit 290 coupled to a respective circuit 292 may comprise a stage of the delay line circuit 270a.

A delay element portion of the first stage of the circuit 270a (e.g., the circuit 290a) may have a first input that may receive the signal REF, a second input that may receive the signal REFN, a control input that may receive a signal (e.g., DELa), a first output that may present a delayed version of the signal REF, and a second output that may present a delayed version of the signal REFN. A delay element portion of the second stage of the delay line circuit 270a (e.g., the circuit 290b) may have a first input that may receive the delayed version of the signal REF from the circuit 290a, a second input that may receive the delayed version of the signal REFN from the circuit 290a, a control input that may receive a signal (e.g., DELb), a first output that may present a further delayed version of the signal REF to a first input of the next successive stage (e.g., the circuit 290c), and a second output that may present a further delayed version of the signal REFN to a second input of the next successive stage 290c. The circuit 270a may be configured having a number of stages implemented similarly to the stages comprising the circuits 290b and 292b (e.g., the stages comprising the circuits 290c–290(n–1) and the respective circuits 292c–292(n–1)).

A delay element portion of the final stage of the circuit 270a (e.g., the circuit 290n) may have a first input that may receive the delayed version of the signal REF from the circuit 290(n–1), a second input that may receive the delayed version of the signal REFN from the circuit 290(n–1), a control input that may receive a signal (e.g., DELn), a first output that may present the signal REF_DELa and a second output that may present the signal REFN_DELa. The signals DELa–DELn may be implemented as control signals. The signals DELa–DELn are generally implemented as current signals. The signals DELa–DELn may be configured to control the amount (value, level) of the signal propagation delay (phase adjustment) through the circuit 270a (e.g., the delay of the signals REF_DELa and REFN_DELa relative to the signals REF and REFN generated by the circuits 290a–290n, respectively).

Each of the circuits 292a–292n may have an input that may receive the signal V_TOT, an input that may be connected to the ground potential VSS, and an output that may present the respective signal DELa–DELn. The circuit 292 may be configured to generate the signal DEL in response to the signal V_TOT. The value (level) of the current signal DEL may generated in response to the value (level) of the signal V_TOT. Thus, the signal propagation delay of the circuit 270a may be determined (e.g., controlled) in response to the control signal V_TOT.

The circuit 270b may be implemented similarly to the circuit 270a. The circuit 270b may have an input that may receive the signal REF, an input that may receive the signal REFN, an input that may receive the signal V_TOT, an output that may present the signal REF_DELb, and an output that may present the signal REFN_DELb. The circuit 270b may be configured to generate the signals REF_DELb and REFN_DELb in response to the signals REF, REFN, and V_TOT (e.g., the circuit 270b may be configured to provide phase adjustment (delay) to the signals REF and REFN in response to the signal V_TOT).

The circuit 270b generally comprises one or more circuits 294 (e.g., 294a–294n) and one or more circuits 296 (e.g., 296a–296n). The circuit 294 may be implemented similarly to the circuit 290 and the circuit 296 may be implemented similarly to the circuit 292. The circuit 270b generally comprises one or more stages that comprise the circuits 294a–294n connected in series and coupled to a respective one of the circuits 296a–296n. The circuits 296a–296n may be configured to generate a respective control signal (e.g., DEL_180a–DEL_180n) in response to the signal V_TOT. The signals DEL_180a–DEL_180n may be implemented as control signals. The signals DEL_180a–DEL_180n are generally implemented as current signals. The signals DEL_180a–DEL_180n may be configured to control the amount (value, level) of the signal propagation delay (phase adjustment) through the circuit 270b (e.g., the delay of the signals REF_DELb and REFN_DELb relative to the signals REF and REFN generated by the circuits 294a–294n, respectively). While the delay circuit 240 has been described in connection with the current controlled delay circuits 290 and 294 and the respective voltage controlled current sources 292 and 296, any appropriate delay line circuitry may be implemented to meet the design criteria of a particular application.

The delay line circuits 270a and 270b are generally well matched. The circuits 270a and 270b may be configured to provide substantially equal delays (phase adjustments) to the signals REF_DELa, REFN_DELa, REF_DELb, and REFN_DELb relative to the signal REF (and/or REFN). In one example, the circuit 100 may be configured (e.g., programmed) to provide 90° of phase adjustment (delay) to the signal CKOUT relative to the signal CLK (or the signal REF) and/or 270° of phase adjustment to the signal CKOUT_180 relative to the signal CLK (or REF). The signal CPBP may be programmed such that the appropriate value of the signal V_TOT is provided to implement the 90° (and/or 270°) phase shift (delay).

However, the signal CPBP may be programmed (presented) such that any user selected (predetermined) phase adjustment (delay) may be very accurately and precisely implemented (generated) to meet the design criteria of a particular application. The signal V_TOT generally controls the propagation delay of the delay circuit 240. The detector circuit 220 generally settles out when the signals CUP and CDN match. Ideally, the signals CUP and CDN match when the phase offset between the signals REF and CKOUT is 0°. The present invention may implement the current steering circuit 224 that may be configured to intentionally steer the error current signal A_CUR (and thus the delay control signal V_TOT) either up or down. The detector circuit 220 may settle at a very precise phase offset in response to the current steering signal A_CUR.

The rising edges of the signals CKOUT and CKOUT_180 may be implemented to precisely latch the respective alternating bits of the signal DATA in the circuits 214 and/or 216. The present invention may implement double data rate latching via the rising edges of the signals CKOUT and CKOUT_180 that may provide more accurate, precise and error resistant latching when compared to the conventional approach of double data rate latching on a rising and a falling edge of a single clock signal.

Since (i) the signals CLK and CLK_L are generally complements, (ii) the latch circuits (e.g., the circuits 214 and 216) are generally well matched, (iii) the buffer circuits (e.g., the circuits 210a and 210b and the circuits 242a and 242b) are generally well matched, and (iv) the delay line circuits (e.g., the circuits 270a and 270b) are generally well matched, any mismatch and/or error in the signal CLK (or the signal REF) is generally propagated similarly in the signal CLK_L (or the signal REFN) such that the signals CKOUT and CKOUT_180 remain at precisely the same phase relationship as the signals CLK and CLK_L (and/or REF and REFN).

The circuit 100 of the present invention may be configured to generate very accurate and precise output clock signal phase offset adjustment. The circuit 100 may be configured to generate output clock signal phase adjustment in response to current density matching. The present invention may implement current density matching via providing one or more switchable (e.g., controlled, programmable) matched current sources (e.g., the current sources 260 and/or 262 of the circuit 222 and the current sources 260 of the circuit 224) that are configured to generate substantially equal currents.

The present invention may implement latch control clock signals (e.g., the signals CKOUT and CKOUT_180) at substantially equal phase relationships to the input clock (e.g., the signals CLK and CLK_L). As such, the present invention may (i) reduce and/or eliminate duty cycle control and latch setup/hold errors and (ii) reduce and/or eliminate problems due to the input clock signals CLK and CLK_L (and/or REF and REFN) having a duty cycle of other than 50% when compared to conventional double data rate approaches.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a first circuit configured to generate a first phase control signal in response to a phase difference between a first input clock signal and a first output clock signal;
    a second circuit configured to generate a second phase control signal in response to a phase adjust signal;
    a device configured to generate a delay control signal by adding said first phase control signal to said second phase control signal; and
    a third circuit configured to generate said first output clock signal by delaying said first input clock signal in response to a said delay control signal.

2. The apparatus according to claim 1, wherein said phase adjust signal comprises a programmable multi-bit signal.

3. The apparatus according to claim 1, wherein said phase adjust signal is dynamically generated in response to one or more error rates.

4. The apparatus according to claim 1, wherein said phase adjust signal determined a predetermined non-zero phase offset between said first input clock signal and said first output clock signal.

5. The apparatus according to claim 1, wherein said third circuit is further configured to generate a second output clock signal by delaying a second input clock signal per said delay control signal and said second input clock signal comprises a complement of said first input clock signal.

6. The apparatus according to claim 5, wherein said third circuit comprises:
    a first delay line configured to have a propagation delay and generate said first output clock signal; and
    a second delay line configure to have said propagation delay and generate said second output clock signal.

7. The apparatus according to claim 5, further comprising:
    a plurality of latches each triggered by one of said first and said second output clock signal and configured to latch respective alternate bits of a data signal.

8. The apparatus according to claim 1, wherein said apparatus comprises a delay locked loop circuit.

9. The apparatus according to claim 1, wherein said first circuit comprises:
    a detector circuit configured to generate a first pump control signal and a second pump control signal in response to said phase difference; and
    a charge pump circuit configured to generate said first phase control signal in response to said first and said second pump control signal.

10. The apparatus according to claim 1, wherein said device comprises a capacitance configured.

11. The apparatus according to claim 1, wherein said third circuit comprises:
    a plurality of serially connected stages each comprising a current controlled differential buffer circuit coupled to a voltage controlled current source circuit configured to generate said first output clock signal.

12. The apparatus according to claim 1, wherein (i) said first phase control signal comprises a first current having a value, (ii) said second circuit comprises one or more current sources each configured to generate a second current having a fraction of said value and (iii) said second phase control signal comprises a sum of said second currents.

13. The apparatus according to claim 12, wherein each of said current sources comprises:
    a cascoded pair of transistors configured to provide current density matching.

14. An apparatus comprising:
    means for generating a first phase control signal in response to a phase difference between a first input clock signal and a first output clock signal;
    means for generating a second phase control signal in response to a phase adjust signal;
    means for generating a delay control signal by adding said first phase control signal to said second phase control signal; and
    means for generating said first output clock signal by delaying said first input clock signal in response to said delay control signal.

15. A method for generating a first output clock signal, comprising the steps of:

(A) generating a first phase control signal in response to a phase difference between a first input clock signal and said first output clock signal;

(B) generating a second phase control signal in response to a phase adjust signal;

(C) generating a delay control signal by adding said first phase control signal to said second phase control signal; and (D) generating said first output clock signal by delaying said first input clock signal in response to said delay control signal.

16. The method according to claim 15, said method further comprising the steps of:

generating said first phase control signal as a first current having a value;

generating one or more second currents each having a fraction of said value; and generating said second phase control signal by summing said second currents to provide current density matching.

17. The method according to claim 15, wherein step (A) further comprises the sub-steps of:

generating a first pump control signal and a second pump control signal in response to said phase difference; and generating said first phase control signal in response to said first and second pump control signals.

18. The method according to claim 15, wherein step (B) further comprises the sub-step of:

generating said phase adjust signal to produce a predetermined non-zero phase offset in said first output clock signal relative to said first output clock signal.

19. The method according to claim 15, wherein step (C) further comprises the sub-steps of:

generating a delay control signal by accumulating charges from said first and said second phase control signals.

20. The method according to claim 15, further comprising the step of:

generating a second output clock signal by delaying a second input clock signal in response to said delay control signal.

* * * * *